United States Patent [19]

Inoue et al.

[11] Patent Number: 6,079,243
[45] Date of Patent: Jun. 27, 2000

[54] METHOD OF PRODUCTION OF WELDING WIRE

[75] Inventors: Satoshi Inoue; Ichiro Masuda; Toru Ono, all of Tokyo, Japan

[73] Assignee: Nippon Steel Welding Products & Engineering Co., Ltd., Tokyo, Japan

[21] Appl. No.: 09/194,208
[22] PCT Filed: Mar. 27, 1998
[86] PCT No.: PCT/JP98/01411
  § 371 Date: Nov. 20, 1998
  § 102(e) Date: Nov. 20, 1998
[87] PCT Pub. No.: WO98/43776
  PCT Pub. Date: Oct. 8, 1998

[30] Foreign Application Priority Data

Mar. 31, 1997 [JP] Japan ................................ 9-079828

[51] Int. Cl.⁷ .......................... B21B 45/02; B21B 13/10
[52] U.S. Cl. ................................ 72/41; 72/224
[58] Field of Search .................. 72/39, 41, 42, 72/43, 224, 225, 226, 227, 274, 282, 291, 278

[56] References Cited

U.S. PATENT DOCUMENTS 3,380,278  4/1968  Dilling ................................ 72/224

FOREIGN PATENT DOCUMENTS

| 50-3256 | 2/1975 | Japan . |
| 53-80360 | 7/1978 | Japan . |
| 58-56677 | 12/1983 | Japan . |
| 62-183997 | 11/1987 | Japan . |
| 63-36997 | 2/1988 | Japan . |
| 1-233008 | 9/1989 | Japan ........................................ 72/41 |
| 3-90293 | 4/1991 | Japan . |
| 4-52197 | 8/1992 | Japan . |
| 4-371392 | 12/1992 | Japan . |
| 6-15485 | 1/1994 | Japan . |
| 8-281480 | 10/1996 | Japan . |
| 9-70685 | 3/1997 | Japan . |

*Primary Examiner*—Rodney A. Butler
*Attorney, Agent, or Firm*—Wenderoth, Lind & Ponack, L.L.P.

[57] ABSTRACT

In manufacturing of welding wires, rough surfaces are formed on the product wires to ensure retention of applied lubricants for satisfactory feeding performance. For this purpose, steps of dry hole die drawing with an application of powder lubricants, roller dies drawing, and wet hole die drawing are executed, at least in a part of a sequence of wire drawing processes. As a result of denting of the powder lubricants on the surfaces of the wires during the dry hole die drawing, rough surfaces are formed on the drawn wires.

29 Claims, 4 Drawing Sheets

METHOD OF PRODUCTION OF WELDING WIRE

FIELD OF THE INVENTION

The present invention relates to a method for production of welding wires of small diameters such as solid wires and cored wires ensuring particular smooth feeding to welding torches through conduit tubes during welding operation.

BACKGROUND ART

Conventionally in welding such as $CO_2$ gas shielded arc welding and MIG welding, solid wires and cored wires of small diameters such as 0.8 to 1.6 mm are used. Solid wires are homogeneous through the diameter and cored wires are filled with fluxes and other materials in the core of a steel tube shell (also called flux cored wires). These welding wires are provided in spools or, for requirement of continuous supply of long wires, in pail packs. In the usual welding operation, a wire feeding machine set near to the spool and/or the pail pack produces a driving force on the wires, and then feeds out the wires through a conduit tube as far as to the electrode tip in a welding torch at the welding position. The wire feeding machine is composed of a wire-feeding roller driven by a motor and a free-rotating pinch roller to grip and press the wire between the wire-feeding roller. At the central part of the conduit tube which contacts the wire, a liner made by spiral steel wires is provided as a flexible guide for the wire.

Though the conduit tube is usually in a length of 3 to 6 m, for welding of wide areas a tube as long as 20 m is required, and the length of conduit tube is selected in accordance with distance to the welding position. By proper choice of the long conduit tube, welding operation can be easily conducted by moving only a light-weight welding torch even in a narrow space and a high or low place such as when field welding for ship building.

On the other hand, the long conduit tube has a problem of increased resistance in feeding of welding wires. Wires are pushed into the liner inside of the conduit tube by a driving force of the feeding machine, and are subjected to the resistance in feeding due to friction created by contact with the inside wall of the liner. Although for a straight conduit tube high feeding forces are not required, for a conduit tube with a small radius of curvature or with a number of deflection positions, the resistance to feeding is large (especially when the tube is long). In order to perform stable welding operation without the occurrence of defects, it is necessary to feed the welding wire at a predetermined constant speed to the welding spot; that is, good feeding performance is necessary. However, if the resistance to feeding is high, the balance with the driving force of the feeding machine is difficult to maintain, leading to bad feeding performance.

Application of some lubricants is necessary to reduce the feeding resistance of wires through the conduit tubes. For this purpose solid lubricants such as $MoS_2$ are applied to the liner of the conduit tube. However, since the effects are not satisfactory, application of additional lubricants like oil on the surface of wires is necessary. The application of oil on wires could be made in the neighborhood of the wire feeding machine, but accurate control of the coating amount of oil requires an excessive burden on the welding operators, and it is difficult in the actual welding operation. If the amount of oil is not enough, naturally satisfactory lubrication cannot be achieved resulting in bad welding performance. On the other hand if the amount of oil is excessive, slipping occurs between the wire and the wire-feeding roller leading to unstable wire feeding speed, and also an increase in hydrogen content by pick-up in weld metal is anticipated. In addition, since the wire driven out of the feeding roller is subjected to compression, in order to prevent of buckling, the wire is lead into a guide tube connected to the conduit tube immediately after departure from the wire feeding roller. Thus application of oil on the wire must be done before the entry into the feeding roller, so the problem of slipping is inevitable.

Accordingly, makers of welding wires are requested to supply wires with an adequate amount of lubricants, and such wire products are available now. For instance, Japanese published patent No. Sho 50-3256 discloses welding wires coated with lubricants on smooth and fine surfaces. However, a uniform coating of a given amount of lubricants on the smooth surfaces was revealed to be difficult to achieve. To overcome the difficulty and obtain wires with sufficient lubrication, amounts of coating lubricants are increased, resulting in slipping of wire-feeding rollers and picking-up of hydrogen in the weld metal.

As a countermeasure for the above difficulty, a proposal was made to coat lubricants stably and uniformly along the longitudinal direction of wires by depositing lubricants on dents by increasing the roughness of wire surfaces. For instance, Japanese published patent No. Hei 4-52197 discloses a method of increasing the roughness of wire surfaces by drawing wires after annealing in a particular atmosphere. The method is not usually applicable, however, since the chemical compositions in wires must sufficiently include the elements having a stronger affinity for oxygen than iron, such as Ti, Si and Mn, at the annealing temperature.

On the other hand, Japanese published patent No. Sho 58-56677 discloses a method for obtaining a rough surface by drawing wires through hole dies under forced lubrication by increased pressure on lubrication oils. Although the method decreases the flatness of wire surface, it can hardly obtain deep dents to retain lubricants. Therefore, improvement of feeding performance is not expected if a coating amount of lubricants on the surfaces is not higher than 2.0 grams per 10 kilograms of wire. Other methods proposed for increasing the surface roughness, such as laser irradiation, shot blasting, and embossing by cemented carbide rolls with uneven surfaces, are not practically applicable because of problems of high costs in equipment and operation.

SUMMARY OF THE INVENTION

The present invention is intended to provide a method for producing wires which have rough surfaces necessary to retain lubricants by modifying the process of reduction of diameter in sequence from raw wires to welding wires. Application of lubricants on the surfaces of wires produced by the present method permits satisfactory feeding of welding wires without lack of lubricants even in severe operation conditions.

The present method for production of welding wires through drawing of raw wires is characterized by comprising the steps of dry hole die drawing with an application of powder lubricants, roller dies drawing by using, for example, cassette-type roller dies, and wet hole die drawing, at least in a part of a sequence of wire drawing processes. Furthermore, a succeeding step of drawing by hole dies with the application of lubrication oil may be conducted to make the wire to a product diameter.

In the present method the wires prior to the dry hole die drawing have a surface roughness of preferably at least 0.3 μm in terms of Ra along a longitudinal direction of wires.

Furthermore, the welding wires produced by the present invention are either sold wires or cored wires and have a surface roughness Ra of preferably at least 0.08 μm along a longitudinal direction of the wires.

DETAILED DESCRIPTION OF THE INVENTION

In the method for production of welding wires by drawing from raw wires to smaller diameters, the present invention differs from the conventional methods (at least in a part) at the later stage of drawing. The raw wires for production of solid wires are hot-rolled wires of 10 mm or so in diameter produced by wire rod mills. The raw wires for production of cored wires are tubes in which filler materials, such as fluxes, are filled by supplying from one end of long tubes of 10 mm or so in diameter with the application of vibration. Alternatively, tubes may be made by steel bands continuously bent by rolls into a U-shape, filled with filler materials, further formed into a cylindrical shape, and welded at the seam. In the present invention, the cored wire is not limited to the closed-seam type, but also includes an open-seam type with folded-in seam.

Although drawing into welding wires is sometimes executed continuously in a single stage, explanation will be made for the case of a separate two-stage drawing process including roughing and finishing. In manufacturing of solid wires, starting wire rods are pickled to remove oxide scale formed at high temperatures in hot rolling, and lubrication films such as phosphate are formed on them. The wire rods are then transferred into the roughing process. In the roughing process, wires are reduced in diameter by passing continuously through a series of hole dies under dry lubrication with lubricants containing mainly metal soap. In the roughing process, some of the hole dies can be replaced by roller dies which pass the wire through a pair of free rotating rollers. Drawing using roller dies permits a large reduction in a draft, while a large reduction in hole die drawing requires a high drawing force tending to lead to fracture of wires.

Because the drawn wires after roughing into as much as several times of the final diameter are work hardened, they are softened by annealing to facilitate the latter drawing process. Subsequently, the surfaces are cleansed and plated with copper, then the wires are transferred to further drawing processes. In the above process copper plating may not be applied to stainless steel wires, and annealing may be omitted for some usage of welding wires. In the finishing process, while the wires are continuously drawn into the final diameter through a series of hole dies, drawing is performed usually under wet lubrication by immersing the hole dies in emulsion oil or by spraying emulsion oil into the hole dies. For prevention of buckling while feeding in welding operation, welding wires should have sufficient strength and rigidity, and work hardening during the finish drawing can give this property.

In the above process for production of welding wires, roughing drawing is sometimes executed in multiple stages separated by intermediate annealing for softening. The annealing may be executed by batch in a form of coil in furnaces or continuously by passing through a furnace. Another modification is a combination of continuous annealing and copper plating in a line. Details in processes can be different in accordance with production factories. In the above, the production method of solid wires is mentioned. In the production of cored wires, since drawing just after the filling of filler material may lead to nonuniform distribution of the filler material, cold rolling before rough drawing is executed by groove rolls to be dense enough for prevention of movement of the filler material. The subsequent process is the same as the process for solid wires.

Hereupon, the present invention comprises steps of dry hole die drawing with the application of powder lubricants, subsequent roller dies drawing, and subsequent wet hole die drawing, at least in a part of the sequence of the above mentioned wire drawing processes for production of welding wires. These steps replace conventional drawing solely by hole dies. Through these processes, welding wires of good feeding performance can be produced by forming a roughness great enough for deposition of lubricants on the surfaces of welding wires.

The finishing wire-drawing process of the present invention represents the processing after the dry hole die drawing in the sequence of wire drawing. By operation of the above mentioned three types of drawing processes (at least in a part of a sequence of the wire drawing processes and in particular, in the final process or just prior to the final process), the effects of the present invention can be attained. Therefore, no particular specification is made for a roughing process in the present invention. In addition, any additional drawing process into the finishing process represents no departure from the present invention, although such necessity is not usually found. Furthermore, as will be mentioned later, finish drawing through hole dies with a small reduction into a final diameter can be carried out by application of lubrication oil.

The welding wires produced in accordance with the present invention are provided with a good feeding performance being coated with both solid lubricants and lubrication oil. The purpose of the present invention is to provide welding wires which are coated with these lubricants uniformly and stably on the surface of the wires. The solid lubricants to be used are one or two kinds of $MoS_2$ and $WS_2$. In the following description, the solid lubricants and the lubrication oil to be applied on welding wire product are distinguished from the lubricants for drawing by describing them as solid lubricants for feeding, and as lubrication oil for feeding, respectively. Details of the present invention will be explained in the following.

Figure 1:
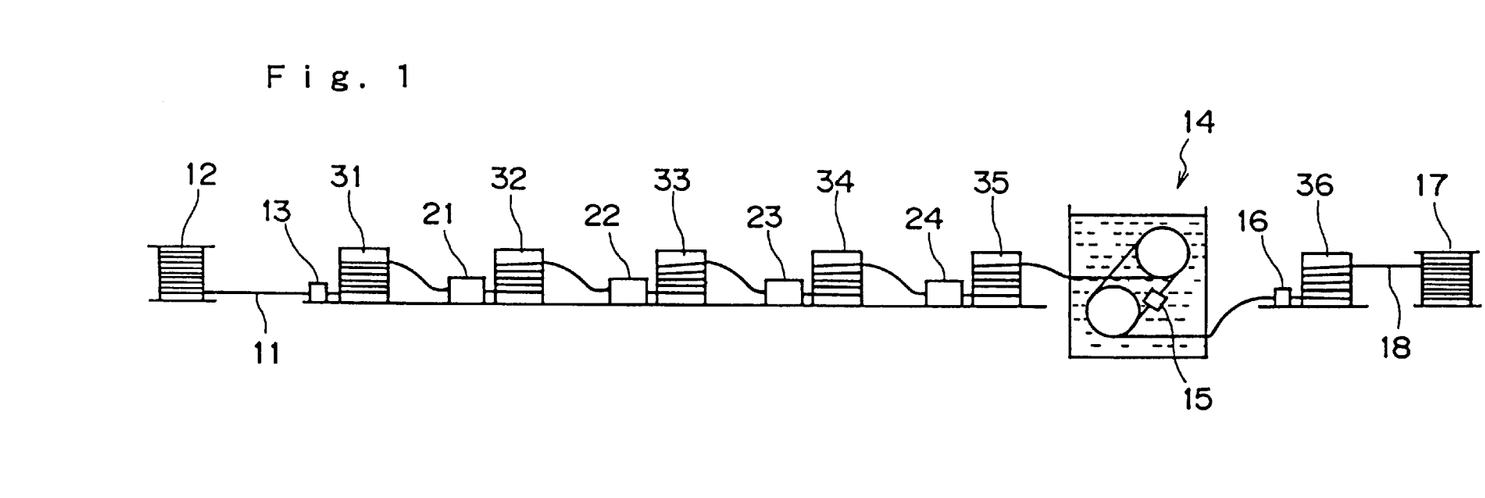
FIG. 1 is a schematic diagram representing an example of equipment used for carrying out the present invention.

FIG. 1 shows a schematic diagram of an example of equipment for executing the present invention. In this example, the starting material of wire 11 is coiled in a supply reel 12. The starting wire is an intermediate product of solid wires or cored wires of about 2 to 5 mm in diameter with or without copper plating. It is preferred that this wire have a surface roughness of at least 0.3 μm in terms of the Ra value defined by JIS B0601-1994 in the profile along a longitudinal direction of wire. This means that some degree of roughness on the surface of the starting material is desirable to effectively achieve the effects of the present invention for formation of the required roughness in the final products. These rough surfaces can be produced mostly by drawing through hole dies under dry lubrication at the last stage of roughing, or sometimes by drawing through roller dies with rough surfaces produced by shot blasting. Furthermore, rough surfaces can be produced by chemical etching while controlling the conditions for pickling prior to the copper plating. The roughness Ra represents an average of the absolute derivation values from the center of a measured roughness curve, and Ra is used in the same manner in the standards of many nations as Japanese industrial standards (JIS). The surface roughness described in the present invention represents values measured as roughness curves along a longitudinal direction of wires if not particularly mentioned otherwise.

To begin with, dry hole die drawing as the first process of the present invention is performed through hole dies 13 by using powder lubricants containing solid lubricants for feeding without using liquid lubricants. 31 in FIG. 1 represents a capstan exerting a force to pull wire, and the wire is wound repeatedly on the cylinder driven for rotation, and elements 32 to 36 are also capstans having the same function. Powder lubricants are strongly inlayed on the surface of drawn wire by drawing the wires through the hole dies 13. Therefore, the original surface roughness is kept and the powder lubricants are retained in the dents on the wire surfaces. The hole dies 13 for dry hole die drawing are preferably rotary dies in order to maintain their holes exactly circular.

Figure 2:
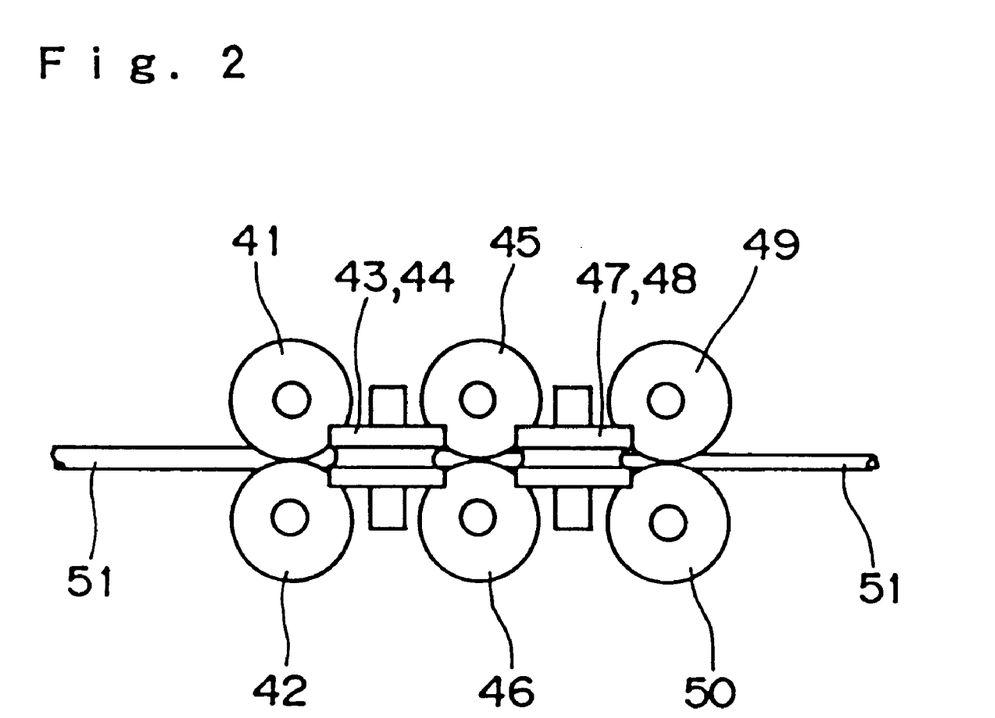
FIG. 2 is a schematic diagram showing cassette-type roller dies.

In the subsequent roller dies drawing, cassette type roller dies 21, 22, 23 and 24 are employed in the example shown in FIG. 1. FIG. 2 shows a schematic diagram of one of the above four cassette-type roller dies. As shown in the figure, small diameter rollers 41 to 50 having a groove with a profile to match the size of wire 51 to be drawn are arranged as pairs, such as 41 and 42, 43 and 44, 45 and 46, to form a unit of roller dies. These roller dies are arranged at a near position so that the rotating axes are set alternately so that the axes of adjoining pairs of rollers are oriented in perpendicular direction as shown in FIG. 2 for five pairs. These pairs of roller dies are called cassette-type roller dies since the units are compactly combined into a block as a whole. Drawing through the roller dies is executed without the further use of lubricants, and wires are reduced in diameter in sequence. Because the powder lubricants inlayed on the wire surfaces by the dry hole die drawing resist collapse of the dents, decrease in roughness is minimized. In other words, in contrast to the conventional hole die drawing, in which much slip between the wire surfaces and the dies occurs, the roller dies drawing retains much of the powder lubricants on the wire surfaces with little stripping off of them.

The wires reduced to a given diameter through the roller dies drawing are further drawn into a product size of 1 to 2 mm diameter by wet hole die drawing. The wet hole die drawing-equipment 14 is composed of a multistage slip-type drawing machine with a multiple number of hole dies 15 immersed in a bath containing lubricant oil. The speed of wet hole die drawing reaches as high as 1000 m per minute. The wet drawing removes excessive lubricants and stains, and makes the wire cross-section an accurate circle. During the drawing passes through a multiple number of hole dies in the wet drawing process, the dents on the wire surface are gradually flattened and the powder lubricants on the wire surfaces are reduced. Therefore, in the process of wet hole die drawing, area reduction must be kept within a small enough amount so as to retain necessary roughness and lubricants satisfactory for feeding performance for use as welding wires. Thus, by designing an optimum allotment of area reduction between dry hole die drawing, roller dies drawing and wet hole die drawing, the necessary amount of roughness and adhered lubricants are ensured. In the example in FIG. 1, finishing drawing is executed after the wet hole die drawing to reduce the wire into a given product size by using hole dies 16 with an application of lubrication oil. For the purposes of product size adjustment and others, such additional drawing without significant reduction in surface roughness after the wet hole die drawing represents no deviation from the scope of the present invention. 17 in FIG. 1 is a take-up reel for coiling of the welding wires 18 produced in the sequence of drawing processes.

Thus, the present invention aims to decrease an amount of reduction in wet hole die drawing by replacing the hole die drawing with roller dies drawing, where in conventional processes, hole die drawing is exclusively adopted in the finishing drawing process. By this process powder lubricants are dented on the wire surfaces during the dry hole die drawing and the dented rough surfaces are retained in the following process of the roller dies drawing due to the compressive deformation mode of the roller dies drawing. In the next process of the wet hole die drawing, the powder lubricants in the dents tend to be discharged without further supply, so the dents get smaller and shallower. Therefore, by limiting an amount of reduction in the wet hole die drawing, necessary roughness is guaranteed for satisfactory performance as welding wire products.

The favorable roughness on the surfaces of welding wires ensuring good feeding performance is at least 0.08 $\mu$m in terms of Ra along the longitudinal profile. The desirable amount of adhered lubricants for feeding as a sum of the amount of solid lubricants for feeding and lubrication oil for feeding is at least 0.3 g for a wire of 10 kg weight. The solid lubricants for feeding which might be any of $MoS_2$, $WS_2$ or a mixture of $MoS_2$ and $WS_2$ as mentioned before, are desirably applied at a rate of at least 0.1 g for a wire of 10 kg weight. $MoS_2$ and $WS_2$ have effects of decreasing the friction between the inner walls of conduit tube liners and wires, and of suppressing an increase in feeding resistance. Solid lubricants for feeding are adhered on the wire surfaces by mixing at least 10% of powder lubricants in the above mentioned dry hole die drawing process.

The lubrication oil for feeding, which might be any of animal fats, vegetable oils, mineral oils or synthetic oils, is desirably adhered at a rate of at least 0.2 g for a wire of 10 kg weight. The lubrication oil supplements the lubrication by solid lubricants retained in the dents on wire surfaces. As explained with FIG. 1, the lubrication oil for feeding can be adhered on the product surfaces by using the oil as lubrication oil for wire drawing in the finishing wire-drawing process through the hole dies 16. Another way is to apply the lubrication oil on the wire surfaces in the recoiling process of coiled wires.

EXAMPLES

In the following the present invention will be explained by referring to examples. Starting wires were prepared by drawing in a roughing process down to 3.3 mm diameter, annealing and copper plating. By following the process shown in FIG. 1, welding wires of 1.4 mm diameter were made in a product form of spool coils. Types of welding wire products were flux cored wires (JIS Z3313 YFW-C5ODR, packing ratio of flux: 15%) and solid wires(JIS Z3313 YGW11). Examination was made for surface morphology and performance in feeding of the wire products. Roughness of the starting wires along the longitudinal direction profile were 0.7 μm and 1.5 μm.

The dry hole die drawing was executed to achieve 20% in area reduction using hole dies of a rotary type. The used powder lubricants were composed of a mixture of graphite, PTFE, potassium soap, titanium oxide, talc, wax and others, and included $MoS_2$ and/or $WS_2$ as lubricants for feeding which were added to the mixture to be a portion of 30% to 50% of the total.

In the cassette-type roller dies drawing, the wires were drawn to reduce the area 40% to 70% without lubrication.

In the wet hole die drawing, the wires were drawn to achieve a total area reduction of 30% to 60% through five to ten dies in a drawing bath containing emulsion oil, of which were composed mainly of synthetic oil and anion surfactant. Successively, drawing to the product diameter at the finishing dies (16 in FIG. 1) was carried out by using palm oil which acts also as a lubricant for feeding.

For evaluation of the effects of the present invention in these tests, examination was made for surface condition and feeding performance of the test produced wires. As the surface condition, the roughness in terms of roughness Ra along the longitudinal profile of wires and the deposit amounts of solid lubricants and lubrication oil for feeding were examined. As the tests for feeding performance, the resistance force to feeding and slip ratios of wires were evaluated according to the procedure as explained later. Then, if the measured values were in the ranges shown below, judgment was made to be satisfactory:

roughness Ra . . . at least 0.10 μm;

amount of solid lubricants for feeding . . . at least 0.10 g/10 kg wire;

amount of lubrication oil for feeding . . . at least 0.10 g/10 kg wire;

resisting force to feeding . . . at most 6.0 kfg;

slip ratio . . . at most 10.0%.

TABLE 1

| No. | type of wire* | sureface roughness of staring wires Ra (μm) | kind and amount of lubricants for feeding in powder lubricants (%) | | drawing schedule | | | |
|---|---|---|---|---|---|---|---|---|
| | | | | | dry hole dies | | roller dies | wet hole dies |
| | | | | | diameter finished (mm) | area redcuction (%) | diameter finished (mm) | area redcuction (%) | area reduction (%) |
| 1 | F | 0.7 | $MoS_2$ | 40 | 3.04 | 15.1 | 1.70 | 68.7 | 32.2 |
| 2 | F | 0.7 | $MoS_2$ | 40 | 2.95 | 20.1 | 1.70 | 66.8 | 32.2 |
| 3 | F | 0.7 | $MoS_2$ | 40 | 2.86 | 24.9 | 1.70 | 64.7 | 32.2 |
| 4 | F | 0.7 | $MoS_2$ | 30 | 2.95 | 20.1 | 2.20 | 44.4 | 59.5 |
| 5 | F | 0.7 | $MoS_2$ | 40 | 2.95 | 20.1 | 2.20 | 44.4 | 59.5 |
| 6 | F | 0.7 | $MoS_2$ | 50 | 2.95 | 20.1 | 2.20 | 44.4 | 59.5 |
| 7 | F | 1.5 | $MoS_2$ | 40 | 2.95 | 20.1 | 2.20 | 44.4 | 59.5 |
| 8 | F | 0.7 | $WS_2$ | 40 | 2.95 | 20.1 | 2.20 | 44.4 | 59.5 |
| 9 | F | 0.7 | $MoS_2 + WS_2$ | 40 | 2.95 | 20.1 | 2.20 | 44.4 | 59.5 |
| 10 | S | 0.7 | $MoS_2$ | 40 | 2.95 | 20.1 | 1.70 | 66.8 | 32.2 |
| 11 | F | 0.7 | $MoS_2$ | 30 | 2.95 | 20.1 | — | — | 77.5 |
| 12 | F | 0.7 | $WS_2$ | 30 | 2.95 | 20.1 | — | — | 77.5 |
| 13 | S | 0.7 | $WS_2$ | 30 | 2.95 | 20.1 | — | — | 77.5 |
| 14 | F | 0.7 | — | | — | — | — | — | 82.0 |
| 15 | S | 0.7 | — | | — | — | — | — | 82.0 |

*F: flux-cored wire, S: solid wire

Table 1 shows the testing conditions and the examples of No. 1 to No. 10 represent the conditions in accordance with the present invention. In the examples of No. 1 to No. 3, the area reduction in the dry hole die drawing was varied 15, 20 and 25% for a given content of 40% of $MoS_2$ in the powder lubricants. In the examples No. 4 to No. 6, the content of $MoS_2$ in the powder lubricants was varied 30, 40 and 50% at a given area reduction of 20% in the dry hole die drawing. The diameters of wires after the roller dies drawing were 1.70 mm (area reductions: 65 to 69%) for the examples Nos. 1 to 3, and 2.20 mm (area reduction: 44%) for Nos. 4 to 6. The example No. 7 is the case of example No. 5 with the surface roughness of starting wires changed, the example Nos. 8 and 9 are, respectively, the cases of example No. 5 with the types of solid lubricants for feeding changed, and the example No. 10 is the case in which the flux cored wires of No. 2 are replaced with solid wires.

Examples No. 11 to No. 15 represent comparisons not included in the present invention. Examples Nos. 11 to 13 are the cases where the roller dies drawing was not conducted between the dry hole die drawing process and the wet hole die drawing process. Consequently, the area reduction in the wet hole die drawing was as large as 70% or more. Examples Nos. 14 and 15 represent the conventional method process without dry hole die drawing and roller dies drawing.

Figure 3:
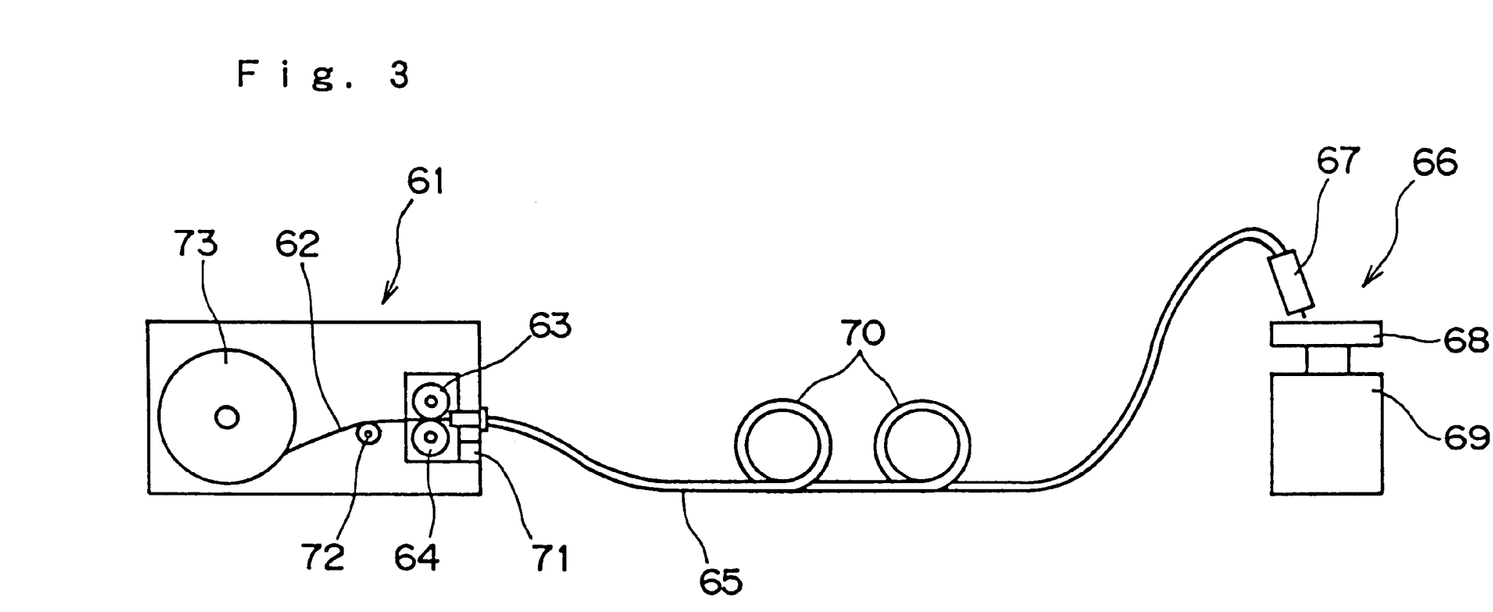
FIG. 3 is a schematic diagram of an apparatus used for testing wire feeding performance.

The test of feeding performance of wires was conducted by the equipment, a schematic diagram of which is shown in FIG. 3. The welding wire 62 coiled on a spool 73 was fed by the wire feeding machine 61 to the welding position 66 through the conduit tube 65. At the welding position 66, a steel plate 68 was set on a turn table 69. Then, by using the welding wire fed out of the welding torch 67 connected to the conduit tube 65, bead-on-plate welding was carried out on the steel plate 68.

The conduit tube 65 was 6 m long, and for giving a feeding resistance to wires, two rings 70 of 150 mm diameter were formed along the length of the conduit tube. Peripheral velocity V γ (=preset velocity of wire feeding) of the feeding roller 64 in the wire feeding machine 61 was measured, and also speed V ω of the wire was measured with the wire speed detector 72 in contact with the moving welding wire. In addition, 63 in FIG. 3 is a pinch roller. These measured values were sent to a computer not shown in the figure, then the slip ratio SL was calculated as below.

$$S_L = (V\gamma - V\omega)/V\gamma \times 100$$

The feeding resistance was detected by a load cell 71 connected to the mechanism of the feeding roller 64, as a reaction force upon the conduit tube caused by the welding wire. The feeding performance of the test wires was evaluated in terms of values of the resistance to feeding and the slip ratio as formerly mentioned.

The welding conditions in the above feeding performance test were set to be $CO_2$ gas as the shielding gas, 33V as the welding voltage, 300 A as the welding current, 30 cm/min as the welding speed, and 10 m/min as the feeding velocity of wire.

APPLICATION TO INDUSTRIES

The present invention provides low cost, satisfactory rough surfaces on welding wires necessary for retention of lubricants. Dry hole die drawing and roller dies drawing are used in place of conventional processes using totally hole die drawing in the sequence of drawing to smaller diameters from starting wires into welding wires. By coating lubricants for feeding on these surfaces, welding wires can be supplied which ensure good feeding performance without the occur-

TABLE 2

| | surface condition | | | wire feeding performance | | |
|---|---|---|---|---|---|---|
| | roughness of | lubricants for feeding | | | | |
| | product | (g per 10 kg of wire) | | resistance to | slip ratio | total |
| No. | Ra ($\mu$m) | solid lubricants | lubrication oil | feeding (kgf) | (%) | evaluation |
| 1 | 0.18 | 0.66 | 0.64 | 2.4 | 5.5 | good |
| 2 | 0.17 | 0.54 | 0.53 | 2.5 | 5.3 | good |
| 3 | 0.17 | 0.67 | 0.55 | 2.3 | 5.6 | good |
| 4 | 0.12 | 0.20 | 0.49 | 3.3 | 3.0 | good |
| 5 | 0.13 | 0.24 | 0.56 | 3.5 | 3.5 | good |
| 6 | 0.13 | 0.30 | 0.54 | 3.4 | 4.3 | good |
| 7 | 0.19 | 0.73 | 0.63 | 2.1 | 6.9 | good |
| 8 | 0.12 | 0.18 | 0.57 | 3.2 | 3.2 | good |
| 9 | 0.12 | 0.21 | 0.71 | 3.3 | 3.5 | good |
| 10 | 0.17 | 0.53 | 0.82 | 2.5 | 5.7 | good |
| 11 | 0.08 | 0.06 | 0.51 | 6.7 | 11.1 | slightly bad |
| 12 | 0.08 | 0.05 | 0.48 | 7.2 | 13.8 | slightly bad |
| 13 | 0.08 | 0.07 | 0.52 | 6.8 | 12.7 | slightly bad |
| 14 | 0.06 | 0 | 0.56 | 8.9 | 30.5 | bad |
| 15 | 0.06 | 0 | 0.49 | 9.0 | 36.7 | bad |

The test results are shown in table 2. The examples Nos. 1 to 10 in accordance with the present invention show low values of feeding resistance in a range of 2 to 4 kgf and a slip ratio 3% to 7%, then give stable welding arc because of excellent feeding performance. Among them, the examples Nos. 1, 2, 3 and 10 give higher content of lubricants for feeding than the examples No. 4, 5, 6, 8 and 9, because of higher product roughness that is caused by smaller area reductions in wet hole die drawing as a result of smaller wire diameters at the finishing of roller dies drawing. Therefore, the examples Nos. 1, 2, 3 and 10 show lower resistance to feeding and a little higher slip ratio within the good performance range. In the example No. 7, the surface roughness of the starting wire Ra is as high as 1.5 $\mu$m, then the surface roughness of the product wire is high and a rather higher amount of lubricants is retained, resulting in a rather higher slip ratio than the example No. 5.

The examples for comparison Nos. 11 to 13 give a surface roughness as low as 0.08 $\mu$m and the lubricant content is rather small. Consequently, examples 11 to 13 show higher resistance to feeding and a higher slip ratio than the examples Nos. 1 to 10 of the present invention, resulting in bad feeding performance. The examples Nos. 14 and 15 have a surface roughness lower than 0.08 $\mu$m and do not have adhered solid lubricants for feeding. Consequently, examples 14 and 15 have higher resistance to feeding and higher slip ratio, leading to a failure in welding because of unstable arc due to bad feeding performance.

Figure 4:
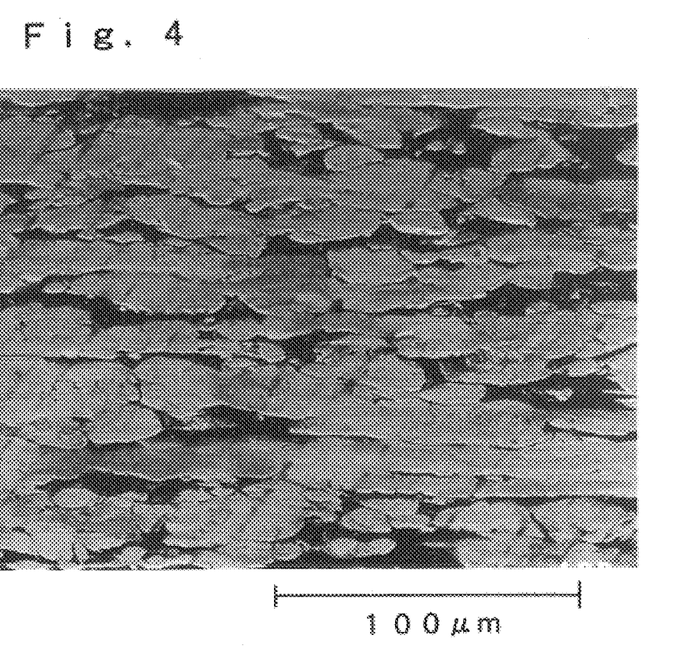
FIG. 4 is a scanning electron micrograph of a surface of a welding wire produced by the present invention.
Figure 5:
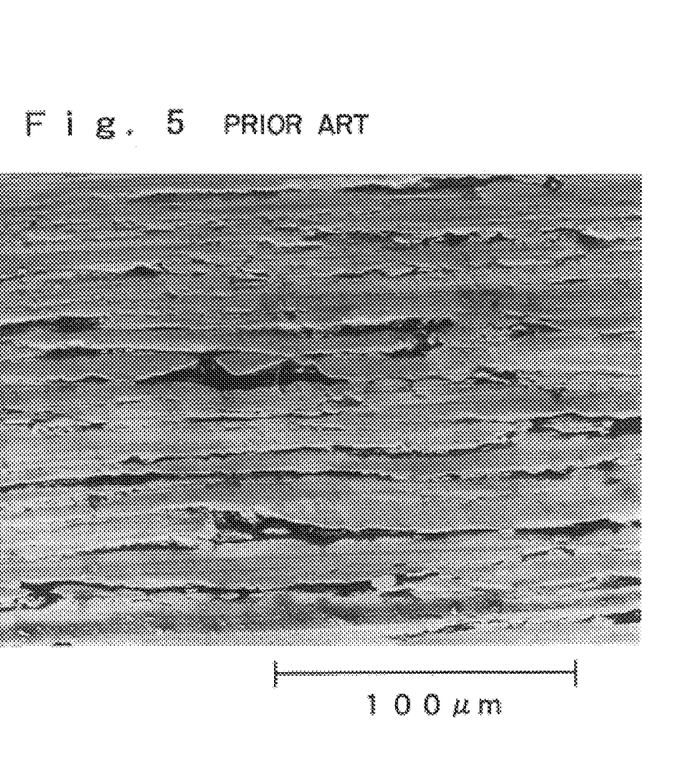
FIG. 5 is a scanning electron micrograph of a surface of a welding wire produced by a comparison method.

FIG. 4 and FIG. 5 show scanning electron micrographs of the surfaces of the products manufactured under the conditions No. 2 and No. 11. The surface in FIG. 4 is a sufficiently rough surface of the welding wire product of the present invention. The surface in FIG. 5 is a rather smooth surface of the product by the prior art method for comparison.

rence of deterioration in lubrication even under severe operating conditions.

We claim:
1. A method of manufacturing welding wires, comprising:
    drawing raw wires through a dry hole die to obtain dry hole-drawn wires, wherein powder lubricants are applied to the raw wires during said drawing of the raw wires through said dry hole die, said powder lubricants including at least one of $MoS_2$ and $WS_2$;
    drawing the dry hole-drawn wires through roller dies to obtain roller-drawn wires;
    drawing the roller-drawn wires through a wet hole die to obtain wet hole-drawn wires; and
    coating the wet hole-drawn wires with lubricating oil to obtain welding wires.
2. The method of claim 1, wherein said drawing of the raw wires through a dry hole die, said drawing of the dry hole-drawn wires through roller dies, said drawing of the roller-drawn wires through a wet hole die, and said coating of the wet hole-drawn wires comprise a final portion of the method of manufacturing welding wires.
3. The method of claim 1, wherein said coating of the wet hole-drawn wires comprises drawing the wet hole-drawn wires through a hole die to obtain the welding wires having a product diameter, and applying said lubricating oil to the wet hole-drawn wires during said drawing of the wet hole-drawn wires through the hole die.
4. The method of claim 1, wherein said drawing of the dry hole-drawn wires through roller dies comprises drawing the dry hole-drawn wires through cassette-type roller dies.
5. The method of claim 1, wherein the raw wires comprise annealed, copper-plated raw wires.
6. The method of claim 1, wherein the raw wires have a surface roughness Ra of at least 0.3 $\mu$m along a longitudinal axis of the raw wires.

7. The method of claim 1, wherein the raw wires comprise solid wires.

8. The method of claim 1, wherein the raw wires comprise closed-seam cored wires.

9. The method of claim 1, wherein the welding wires have a surface roughness Ra of at least 0.08 μm along a longitudinal axis of the welding wires.

10. The method of claim 3, wherein said drawing of the dry hole-drawn wires through roller dies comprises drawing the dry hole-drawn wires through cassette-type roller dies.

11. The method of claim 3, wherein the raw wires comprise annealed, copper-plated raw wires.

12. The method of claim 3, wherein the raw wires have a surface roughness Ra of at least 0.3 μm along a longitudinal axis of the raw wires.

13. The method of claim 3, wherein the raw wires comprise solid wires.

14. The method of claim 3, wherein the raw wires comprise closed-seam cored wires.

15. The method of claim 3, wherein the welding wires have a surface roughness Ra of at least 0.08 μm along a longitudinal axis of the welding wires.

16. The method of claim 4, wherein the raw wires comprise annealed, copper-plated raw wires.

17. The method of claim 4, wherein the raw wires have a surface roughness Ra of at least 0.3 μm along a longitudinal axis of the raw wires.

18. The method of claim 4, wherein the raw wires comprise solid wires.

19. The method of claim 4, wherein the raw wires comprise closed-seam cored wires.

20. The method of claim 4, wherein the welding wires have a surface roughness Ra of at least 0.08 μm along a longitudinal axis of the welding wires.

21. The method of claim 5, wherein the raw wires have a surface roughness Ra of at least 0.3 μm along a longitudinal axis of the raw wires.

22. The method of claim 5, wherein the raw wires comprise solid wires.

23. The method of claim 5, wherein the raw wires comprise closed-seam cored wires.

24. The method of claim 5, wherein the welding wires have a surface roughness Ra of at least 0.08 μm along a longitudinal axis of the welding wires.

25. The method of claim 6, wherein the raw wires comprise solid wires.

26. The method of claim 6, wherein the raw wires comprise closed-seam cored wires.

27. The method of claim 6, wherein the welding wires have a surface roughness Ra of at least 0.08 μm along a longitudinal axis of the welding wires.

28. The method of claim 7, wherein the welding wires have a surface roughness Ra of at least 0.08 μm along a longitudinal axis of the welding wires.

29. The method of claim 8, wherein the welding wires have a surface roughness Ra of at least 0.08 μm along a longitudinal axis of the welding wires.

* * * * *